United States Patent
Kamio

(10) Patent No.: US 11,231,076 B2
(45) Date of Patent: Jan. 25, 2022

(54) CLUTCH CONTROL DEVICE

(71) Applicant: DENSO CORPORATION, Kariya (JP)

(72) Inventor: Shigeru Kamio, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/162,651

(22) Filed: Jan. 29, 2021

(65) Prior Publication Data
US 2021/0148420 A1 May 20, 2021

Related U.S. Application Data

(63) Continuation of application No. PCT/JP2019/028092, filed on Jul. 17, 2019.

(30) Foreign Application Priority Data

Aug. 1, 2018 (JP) .............................. JP2018-145050

(51) Int. Cl.
*F16D 48/08* (2006.01)

(52) U.S. Cl.
CPC ........ *F16D 48/08* (2013.01); *F16D 2500/102* (2013.01); *F16D 2500/3024* (2013.01);
(Continued)

(58) Field of Classification Search
CPC ............... F16D 48/08; F16D 2500/102; F16D 2500/3024; F16D 2500/3026;
(Continued)

(56) References Cited

U.S. PATENT DOCUMENTS

| 2007/0202991 | A1  | 8/2007 | Matsumura et al. |
| 2010/0004837 | A1* | 1/2010 | Connolly ................. F16D 28/00 701/68 |
| 2017/0198764 | A1* | 7/2017 | Miyazono ............... F16D 48/06 |

FOREIGN PATENT DOCUMENTS

| EP | 1 688 635 | 8/2006 |
| JP | 1-120438 | 5/1989 |

(Continued)

OTHER PUBLICATIONS

U.S. Appl. No. 17/162,699, to Kamio, entitled "Clutch Control Device", filed Jan. 29, 2021 (28 pages).
(Continued)

*Primary Examiner* — David J Hlavka
(74) *Attorney, Agent, or Firm* — Nixon & Vanderhye P.C.

(57) ABSTRACT

A first engagement member rotates integrally with a first shaft. A second engagement member rotates integrally with a second shaft. An electric clutch device drives the first engagement member with a pressing member that extends and contracts in response to drive of the clutch actuator. The drive control unit performs a position control to control the clutch actuator, such that a drive amount of the first engagement member becomes a target stroke amount, when the first engagement member and the second engagement member are separated from each other and performs a pressing force control to control the clutch actuator, such that the pressing force between the first engagement member and the second engagement member becomes a target pressing force, when the first engagement member and the second engagement member are engaged with each other.

7 Claims, 14 Drawing Sheets

(52) U.S. Cl.
CPC ............ *F16D 2500/3026* (2013.01); *F16D 2500/30415* (2013.01); *F16D 2500/30426* (2013.01)

(58) Field of Classification Search
CPC . F16D 2500/30415; F16D 2500/30426; F16D 48/06; B60K 6/387; B60K 2006/4825; B60K 6/48
See application file for complete search history.

(56) References Cited

FOREIGN PATENT DOCUMENTS

| | | |
|---|---|---|
| JP | 2006-50710 | 2/2006 |
| JP | 2018-39317 | 3/2018 |
| WO | 2005/047723 | 5/2005 |

OTHER PUBLICATIONS

U.S. Appl. No. 17/162,699, filed Jan. 29, 2021, Clutch Control Device.
U.S. Appl. No. 17/162,651, filed Jan. 29, 2021, Clutch Control Device.

\* cited by examiner

CLUTCH CONTROL DEVICE

CROSS REFERENCE TO RELATED APPLICATION

The present application is a continuation application of International Patent Application No. PCT/JP2019/028092 filed on Jul. 17, 2019, which designated the U.S. and claims the benefit of priority from Japanese Patent Application No. 2018-145050 filed on Aug. 1, 2018. The entire disclosures of all of the above applications are incorporated herein by reference.

TECHNICAL FIELD

The present disclosure relates to a clutch control device.

BACKGROUND

Conventionally, a clutch device is provided between a drive motor and an engine or between the drive motor and drive wheels in a vehicle.

SUMMARY

According to an aspect of the present disclosure, a clutch control device is for an electric clutch device that includes: a first engagement member configured to rotate integrally with a first shaft; a second engagement member configured to rotate integrally with a second shaft; and a clutch actuator.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

As follows, examples of the present disclosure will be described.

According to an example of the present disclosure, a clutch is provided between a drive motor and an engine or between the drive motor and drive wheels in, for example, a hybrid vehicle. The clutch is configured to switch between an engaged state and a release state.

According to an example of the present disclosure, a hydraulic clutch is provided between an engine and a drive motor and between the drive motor and a transmission. In this example, a clutch engaging force is generated with a hydraulic pressure. Therefore, in order to generate a thrust force, a hydraulic loss may occur.

According to an example of the present disclosure, a clutch control device controls drive of a clutch actuator of an electric clutch device. The electric clutch device includes: a first engagement member that is configured to rotate integrally with the first shaft; a second engagement member that is configured to rotate integrally with a second shaft; and a clutch actuator. The electric clutch device drives the first engagement member with a pressing member that is configured to extend and contract in response to the drive of the clutch actuator.

According to an example of the present disclosure, the clutch control device includes a state determination unit and a drive control unit. The state determination unit is configured to determine an engagement state between the first engagement member and the second engagement member. The drive control unit is configured to control drive of the clutch actuator according to a determination result of the state determination unit. The drive control unit performs a position control to control the clutch actuator, such that the drive amount of the first engagement member becomes the target stroke amount, when the first engagement member and the second engagement member are separated from each other and performs a pressing force control to control the clutch actuator, such that the pressing force between the first engagement member and the second engagement member becomes a target pressing force, when the first engagement member and the second engagement member are engaged with each other.

The configuration does not use hydraulic pressure to engage the electric clutch device. Therefore, the configuration enables to reduce a hydraulic loss as compared with a configuration in which a clutch thrust is producing by using the hydraulic pressure. Further, the configuration switches the control according to the engagement state. Therefore, the configuration enables to produce high response and smooth engagement of the clutch.

First Embodiment

Figure 1:
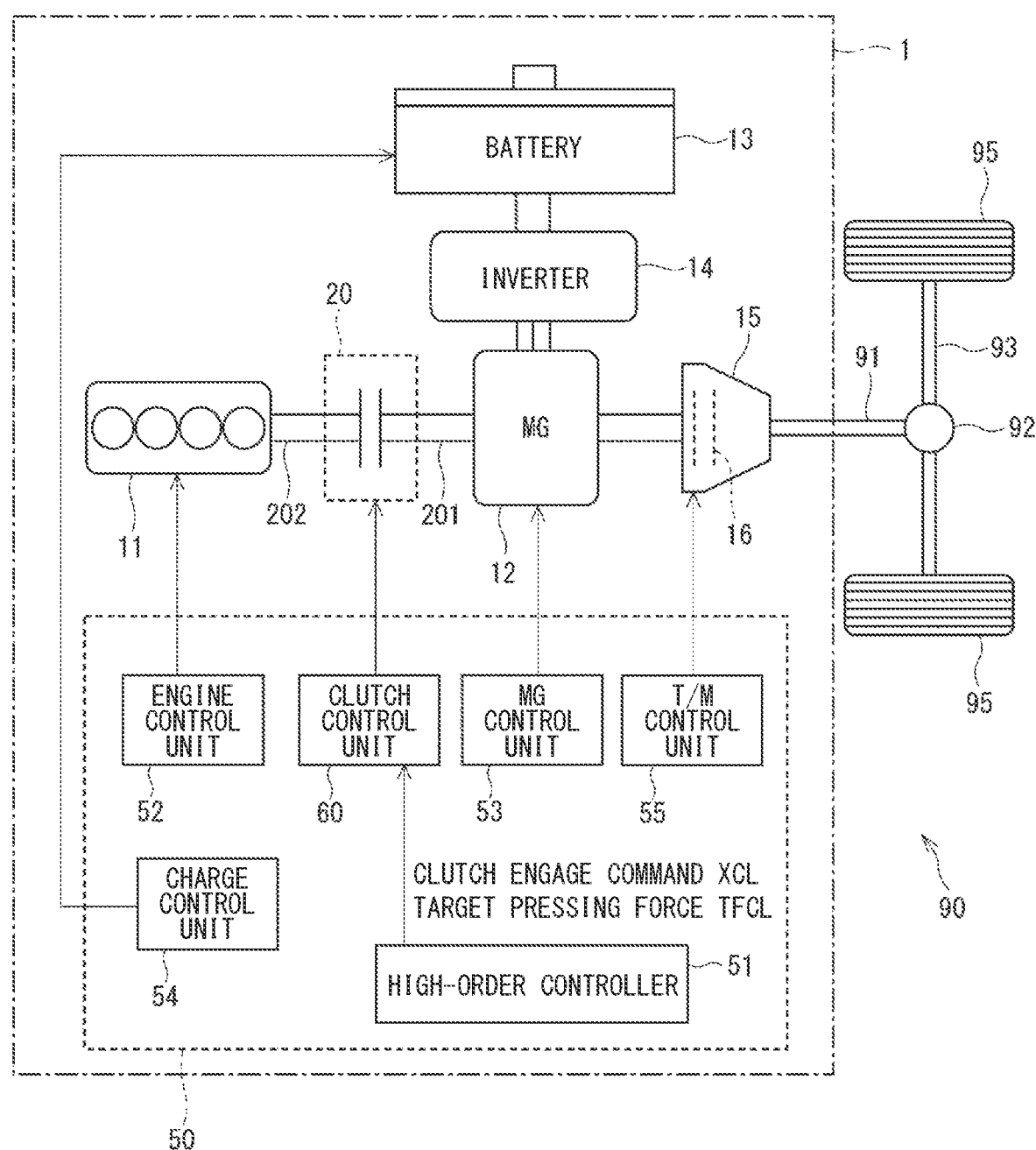
FIG. 1 is a schematic configuration diagram showing a vehicle drive system according to a first embodiment.

Hereinafter, an electric clutch control device will be described with reference to the drawings. Hereinafter, in multiple embodiments, a substantially equivalent configuration will be denoted by an identical reference, and explanation thereof will be omitted. FIGS. 1 to 12 show an electric clutch control device according to a first embodiment. As shown in FIG. 1, a clutch control unit 60 as an electric clutch control device is applied to a vehicle drive system 1. The vehicle drive system 1 includes an engine 11, a main motor 12, a battery 13, an inverter 14, a transmission 15, an electric clutch device 20, and a control device 50. The vehicle drive system 1 is mounted on a vehicle 90. The vehicle 90 of the present embodiment is a so-called hybrid vehicle including the engine 11 and the main motor 12 as a drive source. The vehicle drive system 1 of the present embodiment is a "parallel hybrid system".

Drive wheels 95, which is a driven object, are connected to an axle 93. The axle 93 is connected to a drive shaft 91, to which a driving force of the engine 11 and the main motor 12 is output, via a gear 92. In this configuration, the driving force of the engine 11 and the main motor 12 is transmitted to the drive wheels 95 via the drive shaft 91, the gear 92, the axle 93, and the like, thereby to rotationally drive the drive wheels 95. The engine 11 is an internal combustion engine having multiple cylinders.

The main motor 12 is a so-called "motor generator." The main motor 12 has a function of an electric motor that generates torque by being driven by electric power from the battery 13 and a function of a generator that is driven by the engine 11 or driven when the vehicle 90 is decelerated to generate electricity. The main motor 12 is denoted as "MG" as appropriate in the drawings. The main motor 12 of the present embodiment is a permanent magnet-type synchronous three-phase AC rotary machine.

The battery 13 is a DC power source including a rechargeable secondary battery such as a nickel hydrogen battery or a lithium ion battery. Instead of the battery 13, a power storage device such as an electric double layer capacitor may be used as the DC power source.

The inverter 14 is provided between the main motor 12 and the battery 13. The inverter 14 converts a DC power of the battery 13 into an alternating current and supplies the alternating current to the main motor 12. Further, The inverter 14 converts the AC power generated by using the main motor 12 into a DC power and supplies the DC power to the battery 13.

The transmission 15 is provided between the main motor 12 and the drive shaft 91. The transmission 15 changes the rotation speed of the MG 12 and transmits the rotation to the drive shaft 91. The transmission 15 is, for example, a hydraulic continuously variable transmission (CVT). It is noted that, a multi-speed transmission may be used for the transmission 15. The transmission 15 includes a built-in clutch 16.

Figure 2:
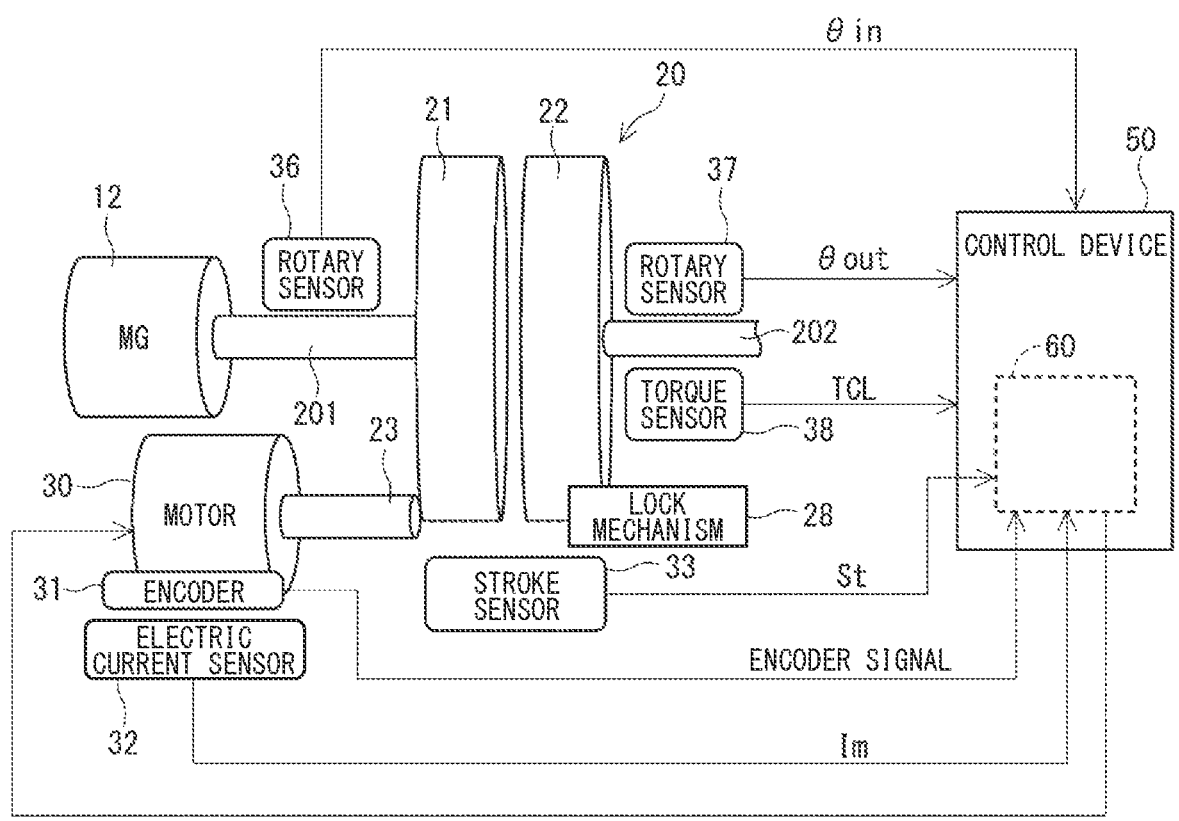
FIG. 2 is a schematic configuration diagram showing an electric clutch device according to the first embodiment.

The electric clutch device 20 is provided between the engine 11 and the main motor 12. In the present embodiment, a first shaft 201 is on the side of the main motor 12, and the second shaft 202 is on the side of the engine 11. As shown in FIG. 2, the electric clutch device 20 is a friction clutch device including friction plates 21 and 22, a lock mechanism 28, a motor 30, which is a clutch actuator, and the like. The first friction plate 21 rotates integrally with the first shaft 201, and the second friction plate 22 rotates integrally with the second shaft 202.

Figure 3:
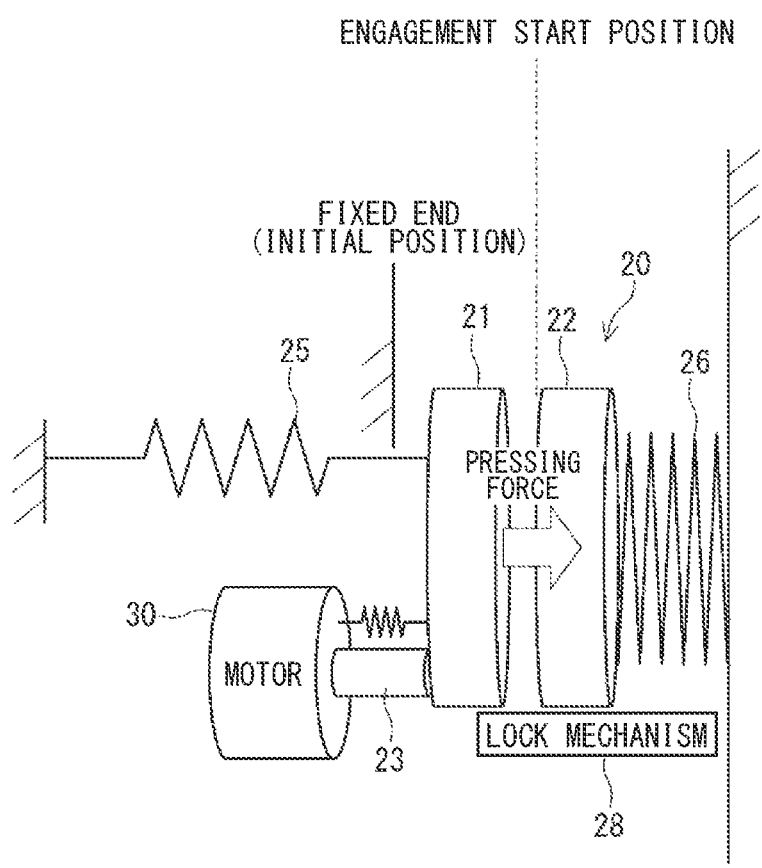
FIG. 3 is a schematic configuration diagram showing a biasing member provided in the electric clutch device according to the first embodiment.

A pressing member 23 is fed in response to rotation of the motor 30 in the positive direction, thereby to press the first friction plate 21 toward the second friction plate 22. As shown in FIG. 3, a first urging member 25 is provided on the side of the first friction plate 21. The first urging member 25 is, for example, a return spring and urges the first friction plate 21 in a direction in which the first friction plate 21 returns to an initial position St0. Even in a configuration where a mechanical play (so-called "play") arises among the output shaft of the motor 30, the pressing member 23, and the first friction plate 21, the first urging member 25 enables to start drive of the motor 30 from a state in which the play is cancelled.

A second urging member 26 is provided on the side of the second friction plate 22. The second urging member 26 is, for example, a leaf spring. When the friction plates 21 and 22 are separated from each other, the second friction plate 22 and the second urging member 26 are separated from each other. When the first friction plate 21 and the second friction plate 22 are in contact with each other, the second friction plate 22 and the second urging member 26 are in contact with each other, and the second urging member 26 urges the second friction plate 22 toward the first friction plate 21. The second urging member 26 enables to appropriately set the relationship between the stroke amount and the clutch load in a state of a half-clutch (so-called "half-clutch").

Figure 4:
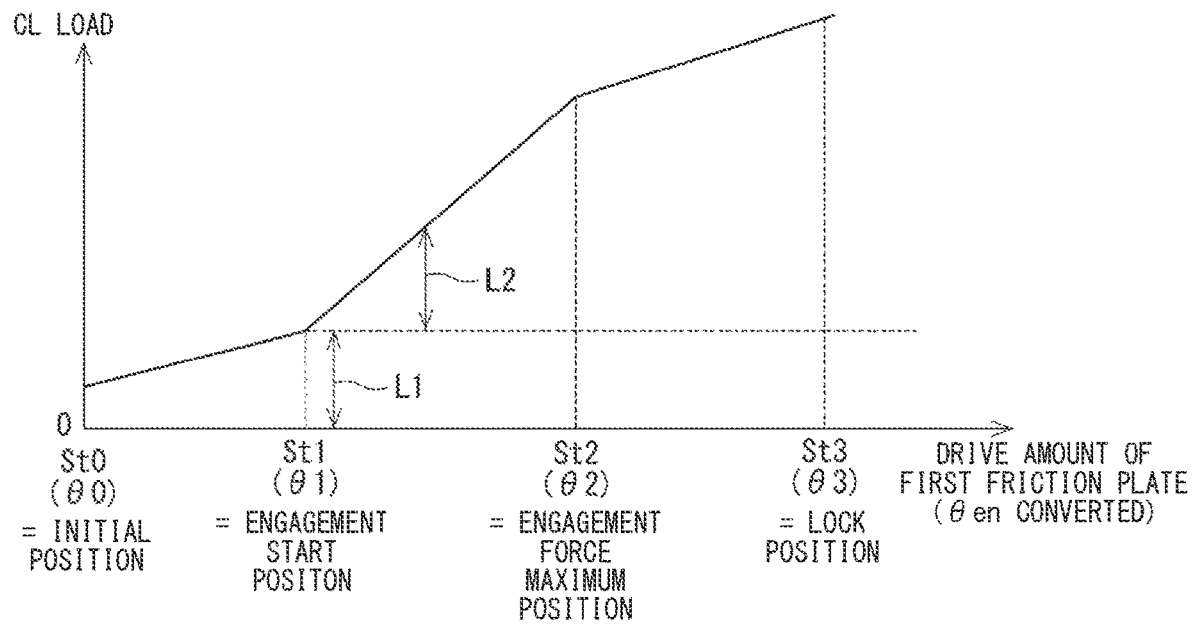
FIG. 4 is an explanatory view showing a drive amount and a clutch load of a first friction plate according to the first embodiment.

FIG. 4 shows an actuator load characteristics of the electric clutch device 20. In FIG. 4, the horizontal axis shows a drive amount of the first friction plate 21, and the vertical axis shows a clutch load. The drive amount of the first friction plate 21 is St0 at the initial position, is St1 at the engagement start position where the first friction plate 21 comes into contact with the second friction plate 22, is St2 at a maximum engagement force position, and is St3 at a lock position. Further, the drive amount of the first friction plate 21 can be converted into a count value of an encoder 31. Therefore, the corresponding values $\theta0$, $\theta1$, $\theta2$, and $\theta3$ are shown in parentheses.

The clutch load when the drive amount of the first friction plate 21 is from the initial position St0 to the engagement start position St1 is caused by the load of the first urging member 25. When the drive amount of the first friction plate 21, which is from the engagement start position St1 to the engagement force maximum position St2, the device is in a half-clad state in which the clutch load is caused by the load of the first urging member 25 and the second urging member 26. When the drive amount of the first friction plate 21 reaches the maximum engagement force position St2, the rotation speed of the first shaft 201 and the rotation speed of the second shaft 202 become the same as each other, and the total driving force of the first shaft 201 is transmitted to the second shaft 202.

When the first friction plate 21 at the maximum engagement force position St2 is further pushed toward the second friction plate 22, the drive amount of the first friction plate 21 reaches the lock position St3, and the lock mechanism 28 locks the first friction plate 21 and the second friction plate 22. When the lock mechanism 28 is operating, even in a case the motor 30 is turned off, the engagement state of the friction plates 21 and 22 is maintained.

As shown in FIG. 2, the motor 30 is a permanent magnet type DC brushless motor, and the encoder 31 is built in. The encoder 31 is, for example, a magnetic rotary encoder and is made up of a magnet that is configured to rotate integrally with the rotor, a magnetic detection hall integrated circuit (IC), and the like. The encoder 31 outputs an encoder signal which is an A phase and B phase pulse signal at predetermined angles in synchronization with the rotation of the rotor to the clutch control unit 60.

A current sensor 32 detects a motor current Im, which is a current flowing through a motor winding of the motor 30, and outputs the detection value to the clutch control unit 60. A stroke sensor 33 detects a drive amount of the first friction plate 21 relative to the engagement start position $\theta1$ at which the first friction plate 21 and the second friction plate 22 start to come into contact with each other. That is, in the stroke sensor 33 of the present embodiment, the detection value up to the engagement start position $\theta1$ is an initial value (for example, 0), and the detection value changes from the engagement start position $\theta1$. Hereinafter, the detection value of the stroke sensor 33 is defined as the stroke amount St. The stroke amount St can be converted from the encoder count value θen. Therefore, the stroke sensor 33 may be omitted.

A first rotation angle sensor 36 detects the rotation angle θin of the first shaft 201, and a second rotation angle sensor 37 detects the rotation angle θout of the second shaft 202. The torque sensor 38 detects the engagement torque TCL of the electric clutch device 20.

As shown in FIG. 1, the control device 50 includes a high-order control unit 51, an engine control unit 52, an MG control unit 53, a charge control unit 54, a transmission control unit 55, and the clutch control unit 60. In the drawing, the transmission control unit is described as "T/M control unit". Each of the control units 51 to 55 and the clutch control unit 60 mainly includes a microcomputer and the like, and internally includes, although not shown in the drawing, a CPU, a ROM, a RAM, an I/O, a bus line interconnecting these components, and the like. Processing executed by each of the control units may be software processing or may be hardware processing. The software processing may be implemented by causing the CPU to execute a program. The program may be stored beforehand in a memory device such as a ROM, that is, in a computer-readable, non-transitory, tangible storage medium. The hardware processing may be implemented by a special purpose electronic circuit. The control units 51 to 55 and the clutch control unit 60 are provided to enable communication with each other via, for example, CAN (Controller Area Network).

The high-order control unit 51 controls entirety of the vehicle drive system 1 and sets a drive mode in which fuel efficiency is optimized. The drive mode includes an MG drive mode, in which the vehicle travels with the driving force of the main motor 12, a hybrid mode, in which the vehicle runs with the driving force of the engine 11 and the driving force of the main motor 12, an engine running mode, in which the vehicle runs with the driving force of the engine 11, and a charging mode, in which the main motor 12 is driven by the driving force of the engine 11 to generate electricity and in which the battery 13 is charged.

The high-order control unit 51 outputs control requests according to the drive mode as being set and the like to the engine control unit 52, the MG control unit 53, the charge control unit 54, the transmission control unit 55, and the clutch control unit 60, respectively. Further, the high-order control unit 51 outputs a clutch engagement command XCL and a target pressing force TFCL to the clutch control unit 60.

The engine control unit 52 controls the drive of the engine 11. The MG control unit 53 controls the drive of the main motor 12. The charge control unit 54 controls the charge amount of the battery 13 such that an SOC of the battery 13 is within a predetermined range. The transmission control unit 55 controls an oil pressure and the like applied to the transmission 15. It is noted that, the MG control unit 53 and the charge control unit 54, in reality, control the drive of the inverter 14 or the drive of the engine 11, however, some control lines are omitted in order to avoid complication.

Figure 5:
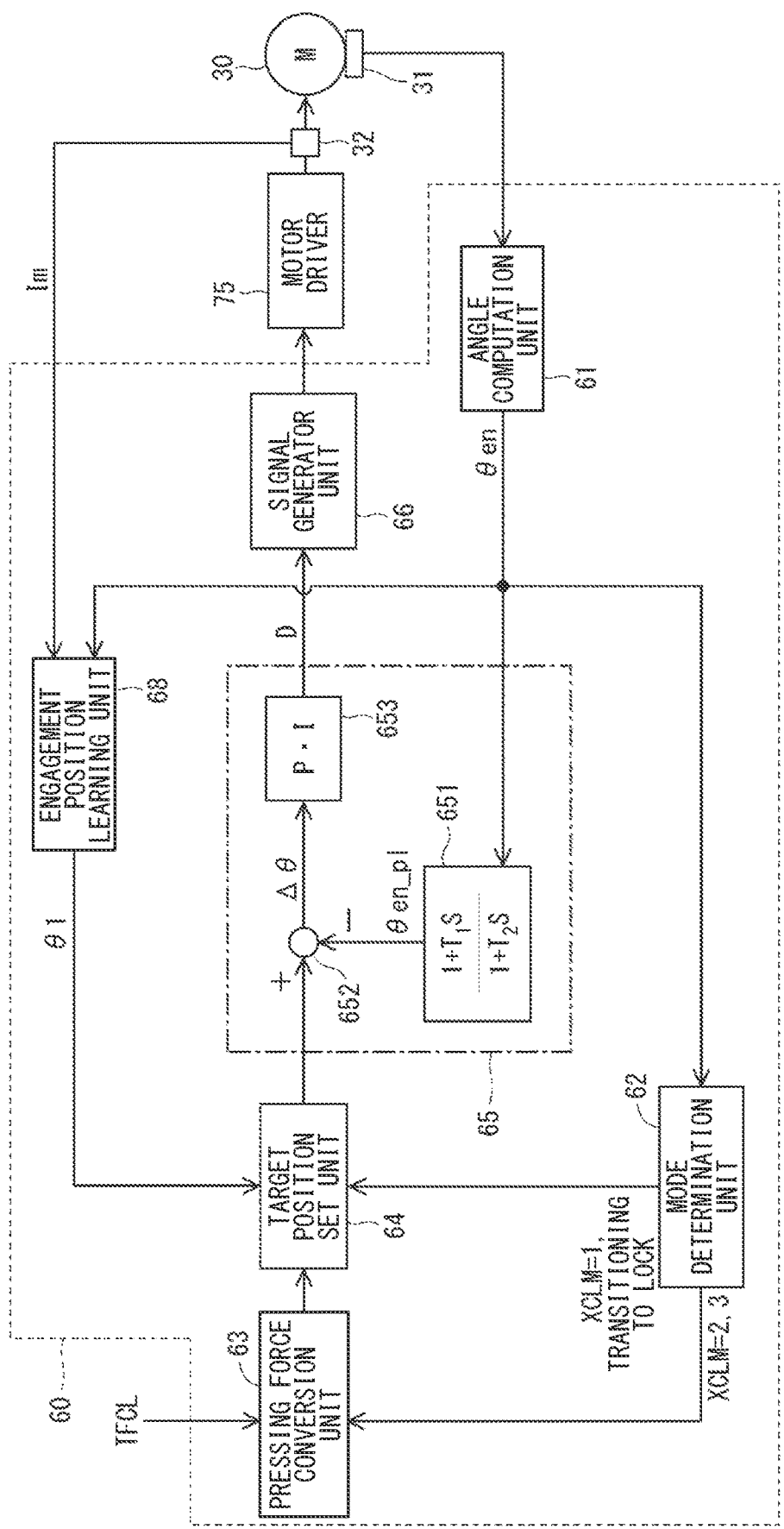
FIG. 5 is a block diagram showing a clutch control unit according to the first embodiment.
Figure 6:
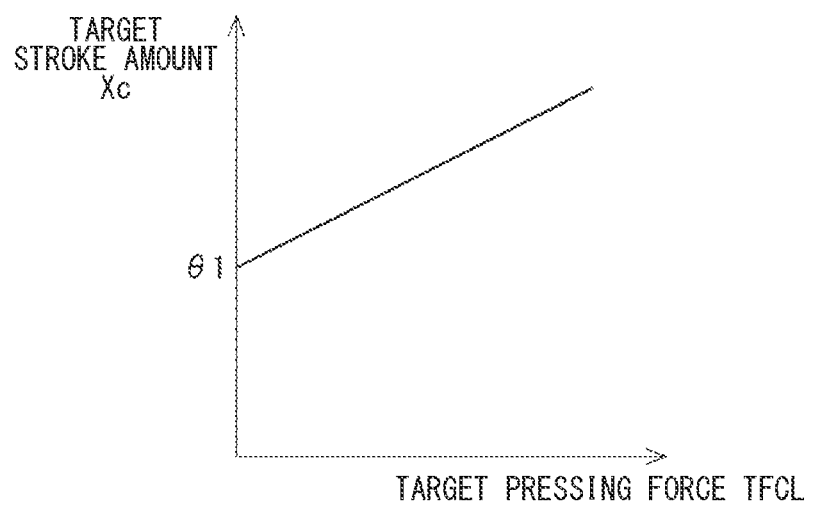
FIG. 6 is a map for converting a target pressing force into a target stroke according to the first embodiment.

As shown in FIG. 5, the clutch control unit 60 controls the drive of the motor 30, thereby to control the engagement state of the electric clutch device 20. The clutch control unit 60 includes an angle computation unit 61, a mode determination unit 62, a pressing force conversion unit 63, a target position setting unit 64, a feedback control unit 65, a signal generation unit 66, an engagement position learning unit 68, and the like.

The angle computation unit 61 computes the encoder count value θen based on the A-phase and B-phase pulse signals output from the encoder 31. The encoder count value θen is a value corresponding to the actual mechanical angle and the electric angle of the motor 30, and in the present embodiment, the encoder count value θen is defined as a "motor angle".

The mode determination unit 62 determines the control mode according to the engagement state of the friction plates 21 and 22 based on the encoder count value θen. In the present embodiment, the control mode XCLM=0 corresponds to a motor off mode, the control mode XCLM=1 corresponds to a stroke control mode, the control mode XCLM=2 corresponds to a pressing force control mode when the clutch is engaged, and the control mode XCLM=3 corresponds to a pressing force control mode when the clutch is released.

The pressing force conversion unit 63, when the control mode XCLM=2 or 3, that is, when the pressing force control mode, converts the target pressing force TFCL acquired from the high-order control unit 51 into the target stroke amount Xc. In the present embodiment, the pressing force of the friction plates 21 and 22 is proportional to the stroke amount from the engagement start position θ1. Therefore, the target stroke amount Xc is converted based on, for example, the map shown in FIG. 6. The computation of the target stroke amount Xc is not limited to use the map shown in FIG. 6 and may use a different map or may perform conversion by using a computation formula, depending on a configuration of the electric clutch device 20 and the like.

The target position setting unit 64 sets the target count value θcmd, which is the target position according to the control mode. When the control mode XCLM=1, that is, in the stroke control mode, the target count value θcmd is set to the engagement start position θ1 or the initial position θ0. When the control mode is XCLM=2, 3, that is, when the pressing force control mode is set, the target count value θcmd is set based on the target stroke amount Xc computed by the pressing force conversion unit 63. When the control mode is XCLM=2 and when the encoder count value θen reaches the maximum engagement force position θ2, the target count value θcmd is set to the lock position θ3.

The feedback control unit 65 has a phase lead filter 651, a subtractor 652, and a controller 653, and performs a derivative-precedence PI control. The phase lead filter 651 performs phase lead compensation for advancing the phase of the encoder count value θen, and computes the phase lead value θen_pl. The subtractor 652 subtracts the phase lead value θen_pl from the target count value θcmd and computes the deviation Δθ. The controller 653 performs PI control or the like to compute the duty D such that the deviation Δθ becomes 0 in order to match the target count value θcmd with the phase lead value θen_pl.

The signal generation unit 66 generates a drive signal based on the duty D computed by the feedback control unit 65. The generated control signal is output to a motor driver 41. The motor driver 75 is, for example, a three-phase inverter and has a switching element (not shown). The motor driver 75 controls on and off operation of the switching element according to the drive signal, thereby to control the drive of the motor 30.

When a start switch of the vehicle 90 is turned on, the engagement position learning unit 68 learns the engagement start position θ1 based on the encoder count value θen, the motor current Im, and the like. The details of learning the engagement start position θ1 will be described later.

Figure 7:
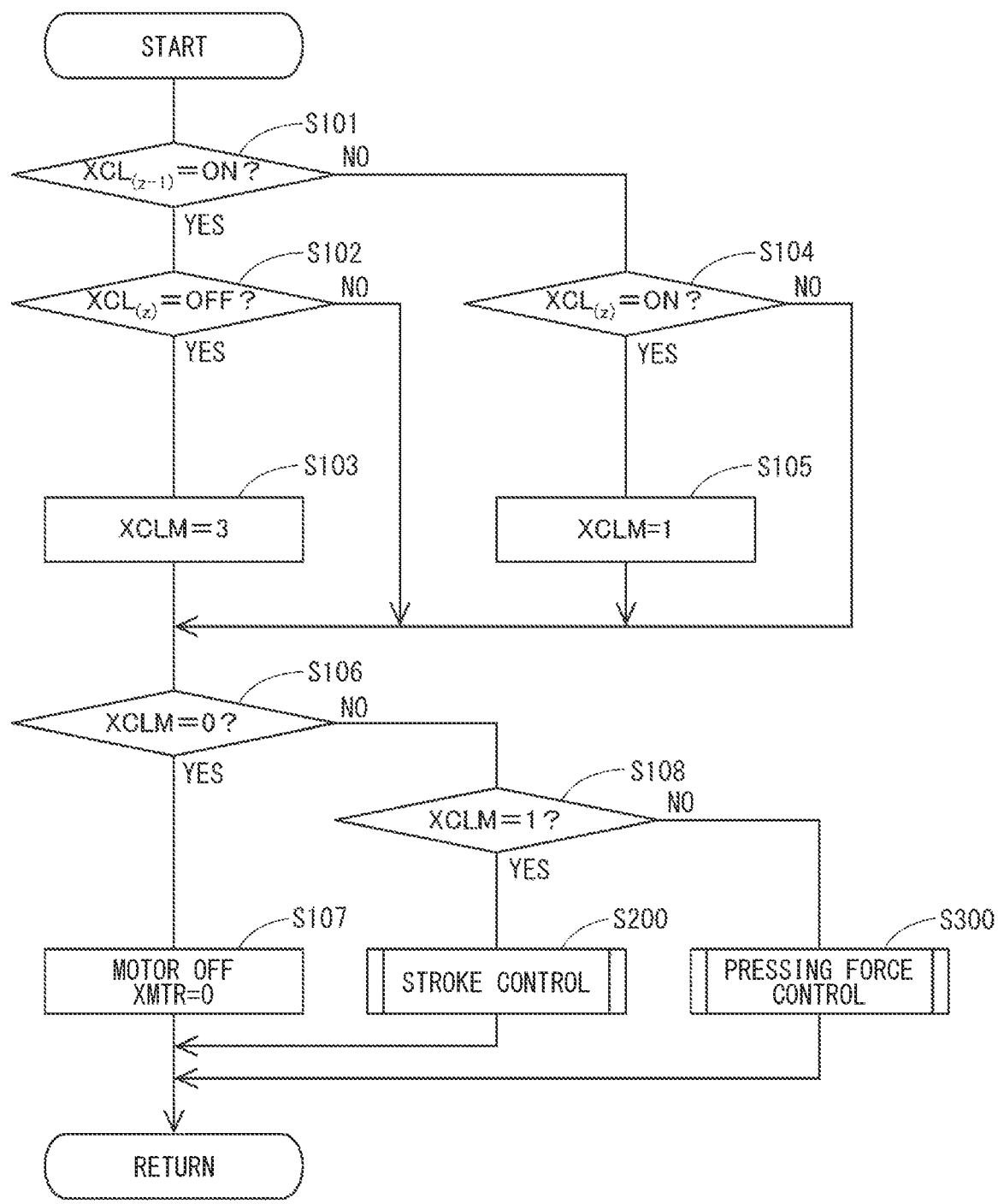
FIG. 7 is a flowchart showing an electric clutch control according to the first embodiment.

The electric clutch control will be described with reference to the flowchart of FIG. 7. This process is performed by the clutch control unit 60 at a predetermined cycle. Hereinafter, "step" in step S101 is omitted, and is simply referred as a symbol "S". The same applies to the other steps.

First, in S101, the mode determination unit 62 determines whether or not the previous clutch engagement command XCL has been on. In the drawing, the subscript (z−1) means the value at the time of the previous process, and the subscript (z) means the value at the time of the current processing. For the current value, the subscripts will be omitted as appropriate. The clutch engagement command XCL is acquired from the high-order control unit 51. When it is determined that the previous clutch engagement command XCL is off (S101: NO), the process proceeds to S104. When it is determined that the previous clutch engagement command XCL is ON (S101: YES), the process proceeds to S102.

In S102, the mode determination unit 62 determines whether or not the clutch engagement command XCL at this time is off. When it is determined that the clutch engagement command XCL at this time is off (S102: YES), that is, when the electric clutch device 20 is switched from on to off in the present process, the process proceeds to S103 where the control mode XCLM=3. When it is determined that the clutch engagement command XCL at this time is ON (S102: NO), the control mode is not changed here.

In S104, to which the process proceeds in the case where the previous clutch engagement command XCL is determined to be off (S101: NO), the mode determination unit 62 determines whether or not the current clutch engagement command XCL is on. When it is determined that the clutch engagement command XCL at this time is on (S104: YES), that is, when the electric clutch device 20 is switched from off to on in the present process, the process proceeds to S105 where the control mode XCLM=1. When it is determined that the clutch engagement command XCL at this time is off (S104: NO), the control mode is not changed here.

In the following S106, the clutch control unit 60 determines whether or not the control mode XCLM is 0. When it is determined that the control mode XCLM is 0 (S106: YES), the process proceeds to S107 where the motor 30 is turned off and where the motor drive flag XMTR is reset. When the motor 30 is off, and the motor drive flag XMTR=0, the present state is maintained. As follows, as appropriate, a state, in which respective flag is set, is set to "1", and a state, in which the flag is not set, is set to "0". When it is determined that the control mode XCLM is not 0 (S106: NO), the process proceeds to S108.

In S108, the clutch control unit 60 determines whether or not the control mode XCLM is 1. When it is determined that the control mode XCLM is 1 (S108: YES), the process proceeds to S200 where the stroke control is performed. The stroke control is to control the first friction plate 21 so as to be in a desired position and is included in a concept of "position control". When it is determined that the control mode XCLM is not 1 (S108: NO), that is, when it is determined that the control mode is 2 or 3 (S108: NO), the process proceeds to S300 where the pressing force is controlled.

Figure 8:
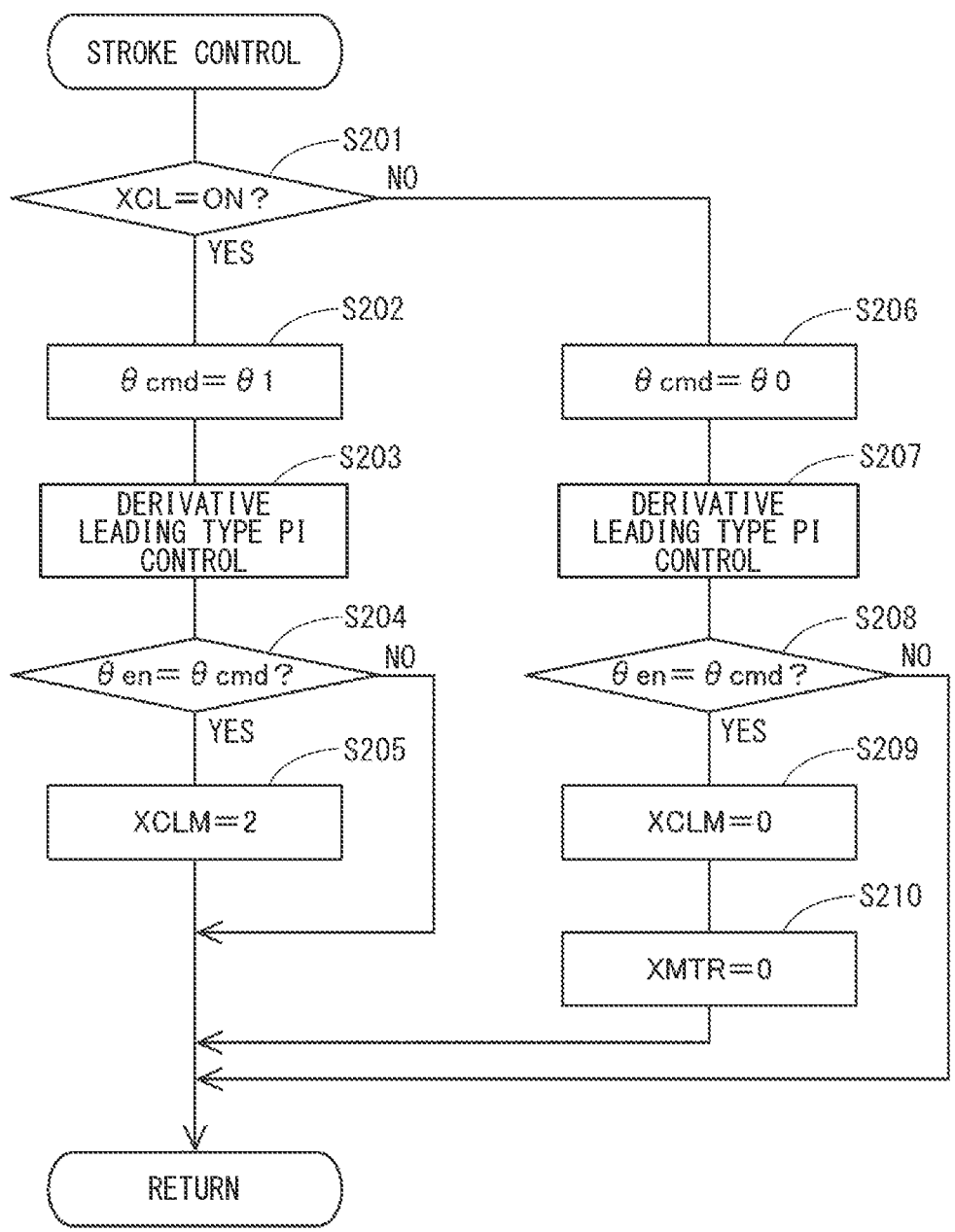
FIG. 8 is a flowchart showing a stroke control according to the first embodiment.

The stroke control will be described with reference to the flowchart of FIG. 8. This process is a process executed in S200 to which the process proceeds when the control mode XCLM=1. In S201, the clutch control unit 60 determines whether or not the clutch engagement command XCL is on. When it is determined that the clutch engagement command XCL is off (S201: NO), the process proceeds to S206. When it is determined that the clutch engagement command XCL is ON (S201: YES), the process proceeds to S202. In S202, the target position setting unit 64 sets the target count value θcmd to the engagement start position θ1. In S203, the feedback control unit 65 performs the derivative-precedence PI control to control the drive of the motor 30.

In S204, the clutch control unit 60 determines whether or not the encoder count value θen matches the target count value θcmd. Herein, when the encoder count value θen falls within a predetermined range including the target count value θcmd (for example, ±2 counts), it is determined that the encoder count value θen matches the target count value θcmd. The same applies to the matching determination between the encoder count value θen and the target count value θcmd in the other steps. When it is determined that the encoder count value θen does not match the target count value θcmd (S204: NO), the control mode XCLM is not changed, and the control mode XCLM=1 is maintained. When it is determined that the encoder count value θen matches the target count value θcmd (S204: YES), the process proceeds to S205 where the control mode XCLM is changed from 1 to 2.

In S206, to which the process proceeds in a case where the clutch engagement command XCL is determined to be off (S201: NO), the target position setting unit 64 sets the target count value θcmd to the initial position θ0. In S207, the feedback control unit 65 performs the derivative-precedence PI control to control the drive of the motor 30.

In S208, the clutch control unit 60 determines whether or not the encoder count value θen matches the target count value θcmd. When it is determined that the encoder count value θen does not match the target count value θcmd (S208: NO), the control mode XCLM is not changed, and the control mode XCLM=3 is maintained. When it is determined that the encoder count value θen matches the target count value θcmd (S208: YES), that is, when the first friction plate 21 returns to the initial position St0, the process proceeds to S209 where the control mode XCLM is changed from 1 to 0. Further, in S210, the clutch control unit 60 sets the motor drive flag XMTR to 0 and turns off the motor 30.

Figure 9:
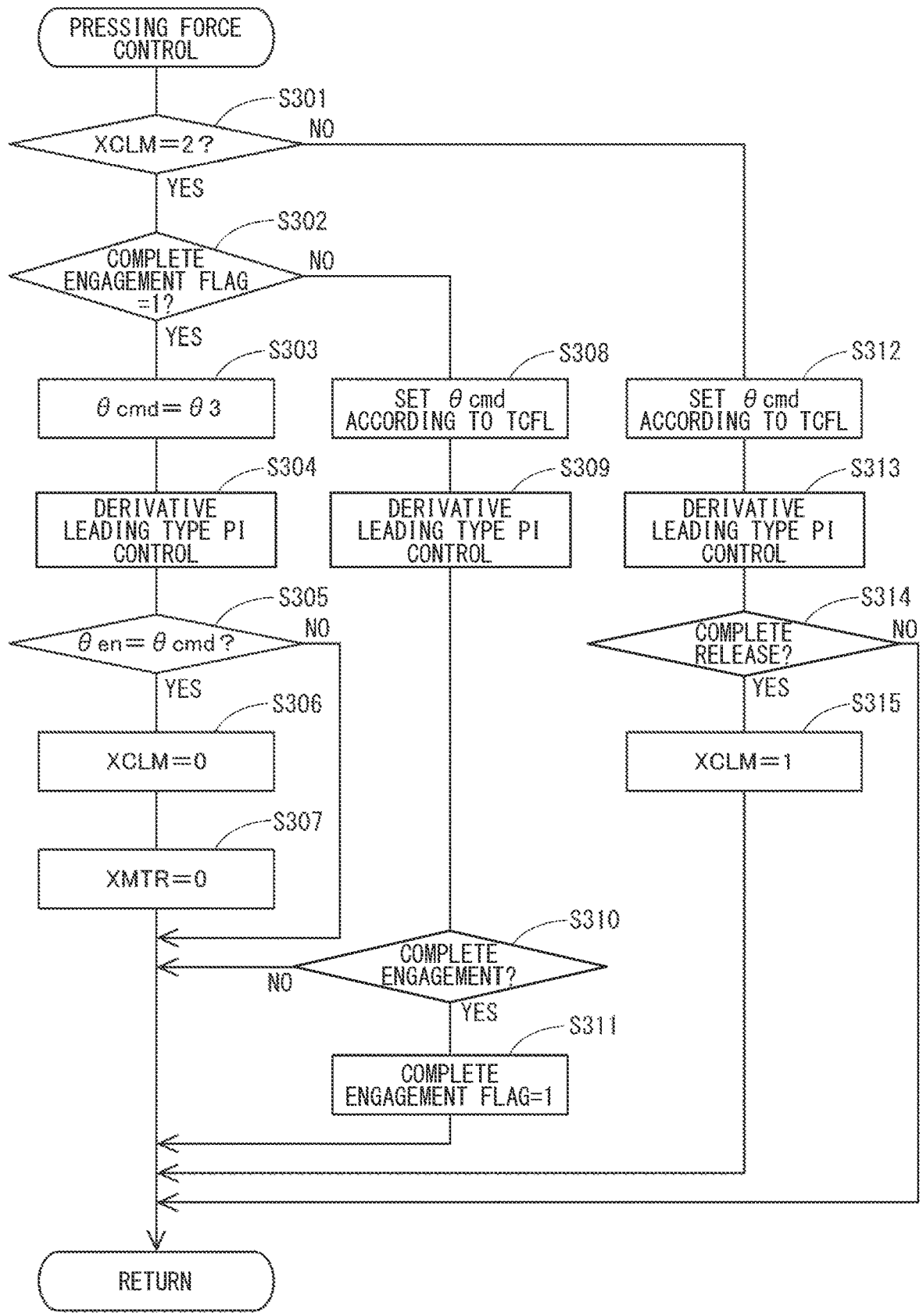
FIG. 9 is a flowchart showing a pressing force control according to the first embodiment.

The pressing force control will be described with reference to the flowchart of FIG. 9. This process is a process executed in S300 to which the process proceeds when the control mode XCLM=2, 3. In S301, the clutch control unit 60 determines whether or not the control mode XCLM is 2. When it is determined that the control mode XCLM is not 2 (S301: NO), that is, when the control mode XCLM is 3, the process proceeds to S312. When it is determined that the control mode XCLM is 2 (S301: YES), the process proceeds to S302.

In S302, the clutch control unit 60 determines whether or not a complete engagement flag, which will be described later, is set. When it is determined that the complete engagement flag is not set (S302: NO), the process proceeds to S308. When it is determined that the complete engagement flag is set (S302: YES), the process proceeds to S303.

In S303, the target position setting unit 64 sets the target count value θcmd to the lock position θ3. In S304, the feedback control unit 65 performs the derivative-precedence PI control to control the drive of the motor 30.

In S305, it is determined whether or not the encoder count value θen matches the target count value θcmd. When it is determined that the encoder count value θen does not match the target count value θcmd (S305: NO), the drive control of the motor 30 is continued. When it is determined that the encoder count value θen matches the target count value θcmd (S305: YES), the process proceeds to S306. When affirmative determination is made in S305, the encoder count value θen becomes the lock position θ3, and the first friction plate 21 has moved to the position where the lock mechanism 28 operates. Therefore, the friction plates 21 and 22 are locked by the lock mechanism 28.

In S306, the mode determination unit 62 sets the control mode XCLM to 0. In S307, the clutch control unit 60 resets the motor drive flag XMTR and turns off the motor 30.

In S308, to which the process proceeds in a case where the control mode XCLM is 2 and where the complete engagement flag is not set (S301: YES and S302: NO), the pressing force conversion unit 63 sets the target pressing force TFCL into the target stroke amount Xc. The target position setting unit 64 sets the target count value θcmd based on the target stroke amount Xc. In S309, the feedback control unit 65 performs the derivative-precedence PI control to control the drive of the motor 30.

In S310, the clutch control unit 60 determines whether or not the electric clutch device 20 is completely engaged. Determination whether or not the electric clutch device 20 is completely engaged may be made based on the engagement torque TCL detected by using the torque sensor 38 or may be made based on the stroke amount St or the encoder count value θen. The same applies to the determination of complete release in S314. When it is determined that the electric clutch device 20 is not completely engaged (S310: NO), the complete engagement flag is not set, and the driving of the motor 30 under the pressing force control is continued. When it is determined that the electric clutch device 20 is completely engaged (S310: YES), the process proceeds to S311 where the complete engagement flag is set.

The process of S312 and S313 to which the process proceeds in a case where the control mode XCLM is 3 (S301: NO) is the same as the process of S308 and S309. In S314, the clutch control unit 60 determines whether or not the electric clutch device 20 is completely released. When it is determined that the electric clutch device 20 is not completely released (S314: NO), the driving of the motor 30 under the pressing force control is continued. When it is determined that the electric clutch device 20 is completely released (S314: YES), the process proceeds to S315 where the control mode XCLM is set to 1 and where the stroke control is performed.

Figure 10:
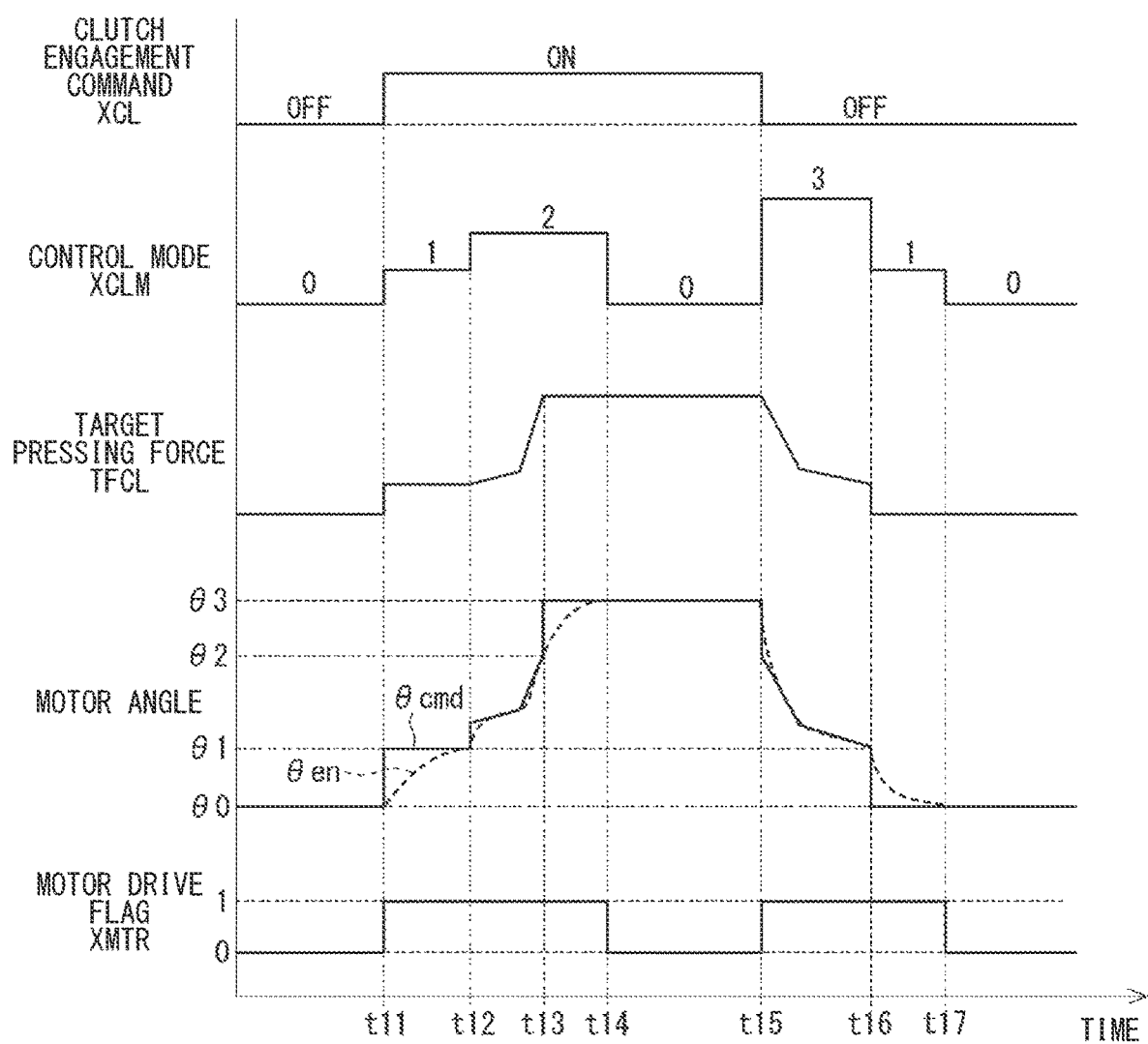
FIG. 10 is a time chart showing the electric clutch control according to the first embodiment.

The electric clutch control of the present embodiment will be described with reference to the time chart of FIG. 10. In FIG. 10, the common time axis is set as the horizontal axis, and the clutch engagement command XCL, the control mode XCLM, the target pressing force TFCL, the motor angle, and the motor drive flag XMTR are shown from the upper chat. As for the motor angle, the target count value θcmd is shown by a solid line, and the encoder count value θen is shown by a broken line. For the sake of explanation, the time scale is appropriately changed and does not necessarily match the actual time scale. The same applies to FIG. 12.

At time t11, when the clutch engagement command XCL from the high-order control unit 51 turns from off to on, the motor drive flag XMTR is set. Further, the control mode XCLM is set to 1, the target count value θcmd is set to the engagement start position θ1, and the motor 30 is driven by the stroke control. While the friction plates 21 and 22 are separated from each other, the stroke control is used to enable to quickly drive the first friction plate 21 to the position where the friction plates 21 and 22 come into contact with each other.

When the encoder count value θen reaches the engagement start position θ1 at time t12, the first friction plate 21 and the second friction plate 22 come into contact with each other. At time t12, the control mode XCLM is switched from 1 to 2, and the stroke control is shifted to the pressing force control. In the pressing force control, the drive of the motor 30 is controlled such that the pressing force becomes the target pressing force TFCL acquired from the high-order control unit 51. In the present embodiment, the target pressing force TFCL is converted into the target stroke amount Xc on the assumption that the stroke amount and the pressing force are 1:1 when the friction plates 21 and 22 are engaged. Further, the drive of the motor 30 is controlled such that the encoder count value θen becomes the target count value θcmd that is set according to the target stroke amount Xc.

At time t13, the drive of the motor 30 is controlled based on the target pressing force TFCL until the friction plates 21 and 22 are completely engaged with each other, thereby to enable to control the engagement state of the electric clutch device 20 in the half-clutch state with high accuracy.

When the friction plates 21 and 22 are completely engaged at time t13, the target count value θcmd is set to the lock position θ3. When the first friction plate 21 is driven to the lock position St3 at time t14, the friction plates 21 and 22 are locked to each other by using the lock mechanism 28 in a completely engaged state. Further, at time t14, the control mode XCLM is set to 0, and the motor drive flag XMTR is reset. At this time, the electric clutch device 20 is locked by using the lock mechanism 28. Therefore, the completely engaged state is maintained even when the drive of the motor 30 is stopped.

At time t15, when the clutch engagement command XCL from the high-order control unit 51 turns from on to off, the motor drive flag XMTR is set. Further, the control mode XCLM is set to 3, and the motor 30 is controlled so as to generate the target pressing force TFCL acquired from the high-order control unit 51, thereby to return the first friction plate 21 to the engagement start position θ1. The control modes XCLM2 and 3 perform the same control, in which the drive direction of the first friction plate 21, that is, the rotation direction of the motor 30 is different.

At time t16, the encoder count value θen becomes the engagement start position θ1, and the first friction plate 21 and the second friction plate 22 are separated from each other. Further, the control mode XCLM is switched from 3 to 1, the target count value θcmd is set to the initial position θ0, and the motor 30 is driven by the stroke control. At time t17, when the encoder count value θen reaches the initial position θ0, and the first friction plate 21 returns to the initial position St0. Thus, the driving of the motor 30 is stopped. Further, the control mode XCLM is set to 0, and the motor drive flag XMTR is reset.

It is noted that, the engagement start position θ1 is displaced due to deterioration over time or the like. Therefore, in the present embodiment, when the vehicle start switch is turned on, the engagement start position θ1 is learned in initial learning. As described above with reference to FIG. 4, the clutch load changes before and after the engagement start position θ1. Therefore, the motor current Im also changes before and after the engagement start position θ1. Therefore, in the present embodiment, the change in the motor current Im is detected, and an inflection point of the motor current Im is learned as the engagement start position θ1.

Figure 11:
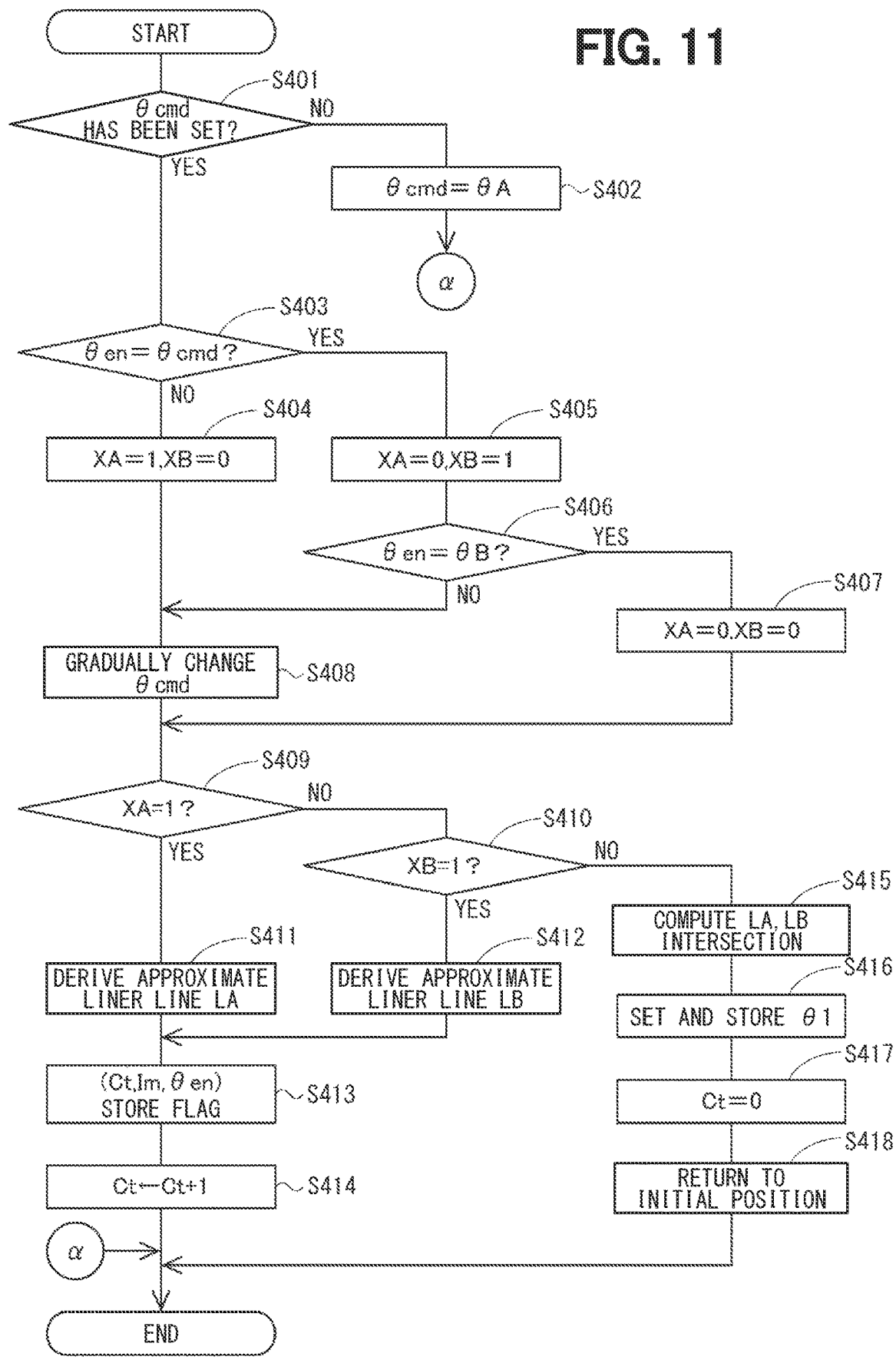
FIG. 11 is a flowchart showing a learning process according to the embodiment.

The learning process of this embodiment will be described with reference to the flowchart of FIG. 11. This process is executed once per trip when the start switch is turned on and when the engagement start position θ1 is an initial value (for example, 0). The frequency of learning may be set as appropriate. The same applies to FIG. 14.

In S401, the engagement position learning unit 68 determines whether or not the target count value θcmd has been set. When it is determined that the target count value θcmd has been set (S401: YES), the process proceeds to S403. When it is determined that the target count value θcmd is not set (S401: NO), the process proceeds to S402.

In S402, the engagement position learning unit 68 sets the target count value θcmd at a before-engagement position A. The before-engagement position θA is a position before the first friction plate 21 comes into contact with the second friction plate 22 in consideration of a tolerance and the like. For example, in a case where the distance from the initial position St0 to the engagement start position St1 is about 1 mm, the before-engagement position θA is set to a count number such that the drive amount of the first friction plate 21 is 0.8 mm. When the target count value θcmd is set, the motor 30 is driven by a process different from this process. The control method of the motor 30 at this time may be appropriately employed.

In S403, the engagement position learning unit 68 determines whether or not the encoder count value θen matches the target count value θcmd. When it is determined that the encoder count value θen does not match the target count value θcmd (S403: NO), the process proceeds to S404. When it is determined that the encoder count value θen matches the target count value θcmd (S403: YES), the process proceeds to S405.

In S404, the engagement position learning unit 68 sets a flag XA indicating that it is a before-engagement section, and resets the flag XB indicating that it is an after-engagement section is B. When the flag XA=1 and the flag XB=0, the state is maintained. In S405, the engagement position learning unit 68 sets the flag XB indicating that it is the after-engagement section B and resets the flag XA. When the flag XA=0 and the flag XB=1, the state is maintained.

In S406, the engagement position learning unit 68 determines whether or not the encoder count value θen has reached an after-engagement position θB. The after-engagement position θB is set to an appropriate value, in consideration of tolerances and the like, such that number of samples from which an approximate straight line LB can be derived, in a state where the first friction plate 21 and the second friction plate 22 are in contact with each other and where the position is before the maximum engagement force position θ2. Herein, when the encoder count value θen falls within a predetermined range (for example, ±2 counts) including the after-engagement position θB, it is determined that the encoder count value θen has reached the after-engagement position θB. When it is determined that the encoder count value θen has not reached the after-engagement position θB (S406: NO), the process proceeds to S408. When it is determined that the encoder count value θen has reached the after-engagement position θB (S406: YES), the process proceeds to S407 where the flag XB is reset. At this time, the flag XA is also reset. The reach of the position θB after engagement may be determined according to a stroke amount St based on the stroke sensor 33 and the time after the transition to the after-engagement section B.

In S408, the target count value θcmd is gradually changed to the side where the first friction plate 21 is driven toward the second friction plate 22. Assuming that the target count value before the change is θcmd (n−1), that the target count value after the change is θcmd (n), and that the gradual variable is a, the target count value θcmd (n) after the change is given by the equation (1).

$$\theta cmd(n) = \theta cmd(n-1) + \alpha \quad (1)$$

Herein, the before-engagement section A and the after-engagement section B are supplemented. In this embodiment, the target count value θcmd is gradually changed from the before-engagement position θA to the side where the friction plates 21 and 22 are engaged. When the encoder count value θen and the target count value θcmd match, it is highly probable that the first friction plate 21 is close to the engagement start position θ1. Therefore, in the present embodiment, the section until the encoder count value θen matches the target count value θcmd is defined as the before-engagement section A, and the section where the encoder count value θen and the target count value θcmd match is defined as the after-engagement section B. It is noted that, even in a case where the switching position between the sections A and B is slightly different from the engagement start position θ1, the influence on the derivation of the approximate straight lines LA and LB described later is small. In addition, it is assumed that, after the encoder count value θen and the target count value θcmd match, the encoder count value θen follows the target count value θcmd, and the state in which the encoder count value θen and the target count value θcmd match is continued.

In S409, the engagement position learning unit 68 determines whether or not the flag XA is set. When it is determined that the flag XA is set (S409: YES), the process proceeds to S411. When it is determined that the flag XA is not set (S409: NO), the process proceeds to S410.

In S410, the engagement position learning unit 68 determines whether or not the flag XB is set. When it is determined that the flag XB is set (S412: YES), the process proceeds to S412. When it is determined that the flag XB is not set (S412: NO), the process proceeds to S415.

In S411, the engagement position learning unit 68 derives the approximate straight line LA of the motor current Im in the before-engagement section A in the x coordinate that is the count value Ct of the timer counter and the y coordinate that is the motor current Im. It is assumed that the approximate straight line LA is updated to increase its number of plots for each operation, in a time period in which the flag XA is set. The approximate straight line of the motor current Im in the before-engagement section A is given by the equation (2).

In S412, the engagement position learning unit 68 derives an approximate straight line LB of the motor current Im in the after-engagement section B in the x-coordinate that is the count value Ct of the timing counter and the y-coordinate that is the motor current Im. It is assumed that the approximate straight line LA is updated to increase its number of plots for each operation, in a time period in which the flag XB is set. The approximate straight line of the motor current Im in the after-engagement section B is given by the equation (3).

$$y = ax + b \quad (2)$$

$$y = cx + d \quad (3)$$

In S413, the engagement position learning unit 68 associates the current count value Ct of the timer counter with the motor current Im and with the currently set flag (that is, flag XA or flag XB) and stores that in a memory (not shown). The motor current Im to be stored may be a value obtained after filtered or the like appropriately. In S414, the engagement position learning unit 68 increments the count value Ct of the timer counter.

When it is determined that the flags XA and XB are not set (S409: NO and S410: NO), that is, when the encoder count value θen reaches the after-engagement position θB, the process proceeds to S415. In S415, the engagement position learning unit 68 computes the intersection between the approximate straight lines LA and LB. In the present embodiment, the intersection between the approximate straight lines LA and LB is regarded as an inflection point of the motor current Im. Assuming that the x coordinate of the intersection between the approximate straight lines LA and LB is the engagement start point XX, the engagement start point XX is represented by the equation (4).

$$XX = (d-b)/(a-c) \quad (4)$$

In S416, the engagement position learning unit 68 sets the encoder count value θen that is stored in association with the count value Ct closest to the engagement start point XX as the engagement start position θ1 and stores it in a memory or the like. In S417, the count value Ct of the time counter is reset. In S418, the clutch control unit 60 sets the target count value θcmd to the initial position θ0 and returns the first friction plate 21 to the initial position St0.

Herein, the approximated straight lines LA and LB are derived in such a manner as described below. In S413, the count value Ct of the timer counter and the motor current Im are associated with each other and stored in a memory or the like. In the present embodiment, linear approximation is performed by, for example, the least squares method by using multiple values (Ct, Im) associated with the flag XA, and the approximate straight line LA is derived. Similarly, linear approximation is performed by, for example, the least squares method by using multiple values (Ct, Im) associated with the flag XB, and an approximate straight line LB is derived. The approximated straight lines LA and LB may be derived by a method other than the least squares method. It is not limited to the linear approximation. An approximation line such as a function of quadratic or higher may be derived, and the engagement start position θ1 may be learned by using the approximation line.

Figure 12:
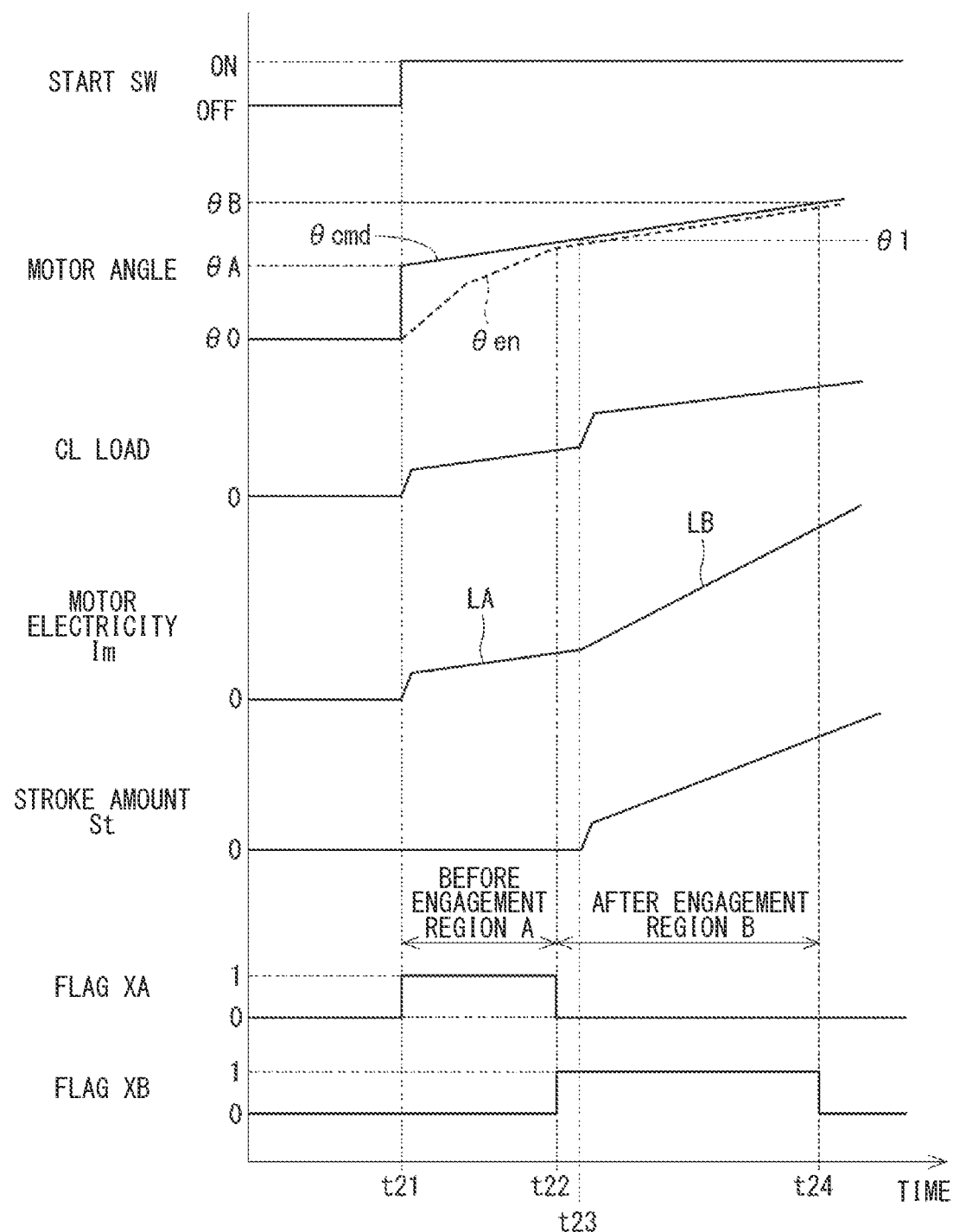
FIG. 12 is a time chart showing the learning process according to the embodiment.

The learning process will be described with reference to the time chart of FIG. 12. In FIG. 12, the on/off state of the start switch, the motor angle, the clutch load, the motor current Im, the stroke amount St, the flag XA, and the flag XB are shown from the upper part with the common time axis as the horizontal axis.

When the start switch is turned on at time t21, the learning process is started. At time t21, the target count value θcmd is set at the before-engagement position θA, and the driving of the motor 30 is started. In addition, the flag XA is set. After the time t21, the target count value θcmd is gradually increased.

When the encoder count value θen matches the target count value θcmd at time t22, the flag XA is reset, and the flag XB is set. After the time x22, the encoder count value θen follows the target count value θcmd. It is noted that, in FIG. 12, the encoder count value θen and the target count value θcmd are slightly shifted from each other for explanation. When the encoder count value θen reaches the after-engagement position θB at time t24, the flag XB is reset, and the first friction plate 21 is returned to the initial position St0. In FIG. 12, the description of the return control is omitted.

When the first friction plate 21 comes into contact with the second friction plate 22 at time t23, the clutch load becomes large, and therefore, the inclination of the motor current Im becomes large. Therefore, in the present embodiment, the intersection between the approximate straight line LA of the motor current Im in the before-engagement section A and the approximate straight line LB of the motor current Im in the after-engagement section B is obtained. Further, the change point of the motor current Im is learned as the engagement start position θ1.

In the present embodiment, the engagement start position θ1 which is the reference position is learned according to the motor current Im for each trip. Therefore, the pressing force can be controlled with high accuracy by using the value, which is obtained by converting the pressing force into the stroke, even in a case where a deviation occurs due to durability or the like.

As described above, the clutch control unit 60 of the present embodiment controls the motor 30 of the electric clutch device 20. The electric clutch device 20 includes a first friction plate 21 that is configured to rotate integrally with the first shaft 201, a second friction plate 22 that is configured to rotate integrally with the second shaft 202, and a motor 30 to drive the motor 30. The electric clutch device 20 drives the first engagement member with the pressing member 23 that configured to extend and contract according to drive of the motor 30.

The clutch control unit 60 includes the mode determination unit 62 and the feedback control unit 65. The mode determination unit 62 determines the engagement state between the first friction plate 21 and the second friction plate 22. In the present embodiment, it is regarded that the friction plates 21 and 22 are engaged even in the state of the half-clutch.

The feedback control unit 65 controls the drive of the motor 30 according to the determination result of the mode determination unit 62. The feedback control unit 65 controls the position of the motor 30 such that the drive amount of the first friction plate 21 becomes the target stroke amount Xc, when the first friction plate 21 and the second friction plate 22 are separated from each other. Further, the feedback control unit 65 performs the pressing force control to control the motor 30 such that the pressing force between the first friction plate 21 and the second friction plate 22 becomes the target pressing force TFCL, when the first friction plate 21 and the second friction plate 22 are engaged.

In this embodiment, hydraulic pressure is not used for the engagement of the electric clutch device 20. Therefore, the configuration enables to reduce the hydraulic loss or to eliminate the hydraulic loss to 0 as compared with the case where the clutch thrust is generated by using hydraulic pressure. In addition, the configuration employs the electric type structure, thereby to enable to perform the control even in a extremely low temperature condition where the hydraulic type structure is not suitable. Therefore, the configuration enables to enlarge the temperature range, in which fuel efficiency can be improved, and to contribute to improvement in fuel efficiency.

Further, in the present embodiment, the control is switched according to the engagement state of the friction plates 21 and 22. Specifically, the configuration controls the position with high response when the friction plates 21 and 22 are in the open state. In addition, the configuration controls the pressing force with high accuracy so as to be the target pressing force TFCL when the friction plates 21 and 22 are in the engaged state. In this way, the configuration enables to produce high response and smooth engagement of the clutch.

The clutch control unit 60 includes the pressing force conversion unit 63 that converts the target pressing force TFCL into the target stroke amount Xc. The feedback control unit 65 controls the motor 30 such that the drive amount of the first friction plate 21 becomes the target stroke amount Xc when the first friction plate 21 and the second friction plate 22 are engaged with each other. In this way, the configuration enables to appropriately control the motor 30 such that the pressing force becomes the target pressing force TFCL. Further, the configuration does not use the value of the torque sensor 38, thereby to enable to appropriately perform the control according to the target pressing force TFCL, even in a configuration in which the torque sensor 38 is not provided.

The clutch control unit 60 includes the engagement position learning unit 68 that learns the engagement start position θ1 between the first friction plate 21 and the second friction plate 22. The configuration learns the engagement start position θ1, thereby to enable to appropriately control the electric clutch device 20 even in a case where the engagement start position θ1 shifts due to durability.

The engagement position learning unit 68 learns the engagement start position θ1 based on the motor current Im, which is the current supplied to the motor 30. Specifically, the configuration learns, as the engagement start position θ1, the position where the motor current Im becomes the inflection point. More specifically, the intersection between the approximate straight line LA of the motor current Im in the before-engagement section A and the approximate straight line LB of the motor current Im in the after-engagement section B is defined as the turning point of the motor current Im. The configuration learns, as the engagement start position θ1, the position that becomes the inflection point. In this way, the configuration enables to appropriately learn the engagement start position θ1 based on the motor current Im even in a case where the engagement start position θ1 is deviated. Further, the configuration enables to learn engagement start position θ1, even in a configuration where the stroke sensor 33 is not provided.

The electric clutch device 20 further includes the lock mechanism 28 that locks the first friction plate 21 and the second friction plate 22 with each other in the engaged state. The feedback control unit 65 performs the position control, such that the drive amount of the first friction plate 21 becomes the target stroke amount Xc that is set according to the lock position θ3 at which the lock mechanism 28 is enabled to lock, after the first friction plate 21 is driven to the maximum engagement force position θ2 at which the first shaft 201 and the second shaft 202 rotate at the same rotation speed. By providing the lock mechanism 28, the configuration enables to maintain the engaged state even when the drive of the motor 30 is stopped. Further, the configuration controls the position from the maximum engagement force position θ2 to the lock position θ3, thereby to enable to appropriately drive the first friction plate 21 to a lockable position by using the lock mechanism 28.

In the present embodiment, the first friction plate 21 corresponds to a "first engagement member", the second friction plate 22 corresponds to a "second engagement member", the motor 30 corresponds to a "clutch actuator", and the motor current Im corresponds to an "actuator current". Further, the clutch control unit 60 corresponds to a "clutch control device", the mode determination unit 62 corresponds to a "state determination unit", and the feedback control unit 65 corresponds to a "drive control unit".

As described above, the drive amount of the first friction plate 21 is a value that can be converted into the encoder count value θen. Therefore, in the present embodiment, the encoder count value θen corresponds to a "drive amount of the first engagement member", and the target count value θcmd corresponds to a "target stroke amount". The configuration controls the motor 30 such that the encoder count value θen corresponding to the drive amount of the first friction plate 21 becomes the target count value θcmd corresponding to the target stroke amount Xc.

Second Embodiment

Figure 13:
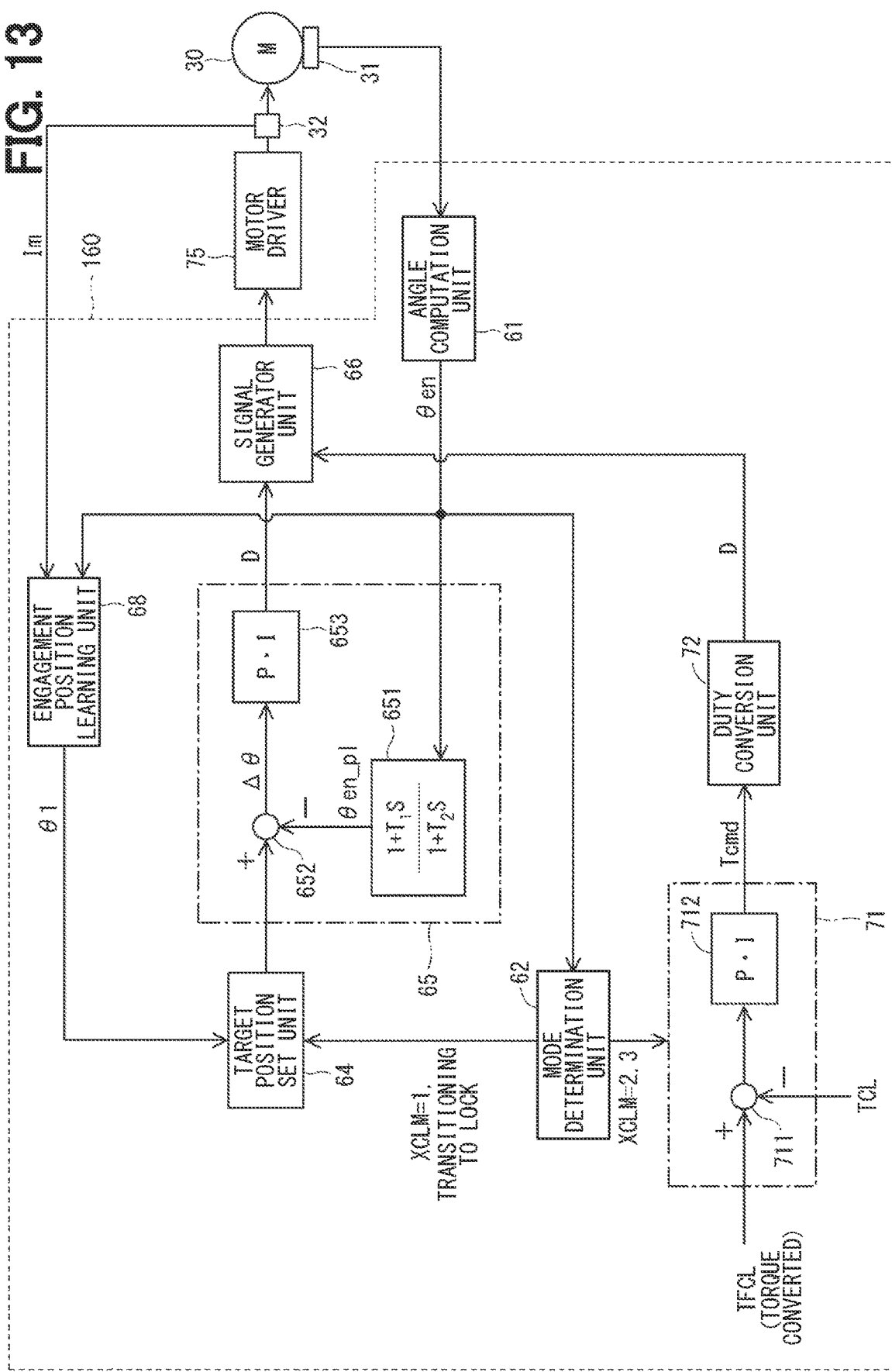
FIG. 13 is a block diagram showing a clutch control unit according to a second embodiment.

A second embodiment is shown in FIG. 13. As shown in FIG. 13, the clutch control unit 160 of the present embodiment includes a torque control unit 71 and a duty conversion unit 72 in place of the pressing force conversion unit 63. In the present embodiment, when the control mode XCLM is 2 or 3, that is, when the pressing control mode is set, Target pressing force TFCL is not converted into the stroke but converted into the torque. In addition, the configuration performs a torque feedback control based on the engagement torque TCL detected by using the torque sensor 38. That is, the pressing force control may be regarded as a "torque control".

The torque control unit 71 includes a subtractor 711 and a controller 712. The subtractor 711 subtracts the engagement torque TCL from a torque conversion value, which is acquired by converting the target pressing force TFCL into the torque, thereby to compute the deviation ΔT. The controller 712 computes the target motor torque Tcmd by performing a PI control or the like such that the deviation ΔT becomes 0. The duty conversion unit 72 converts the target motor torque Tcmd into a duty D. This configuration also produces the same effects as those of the embodiment described above. In the present embodiment, the feedback control unit 65 and the torque control unit 71 correspond to the a "drive control unit".

Third Embodiment

Figure 14:
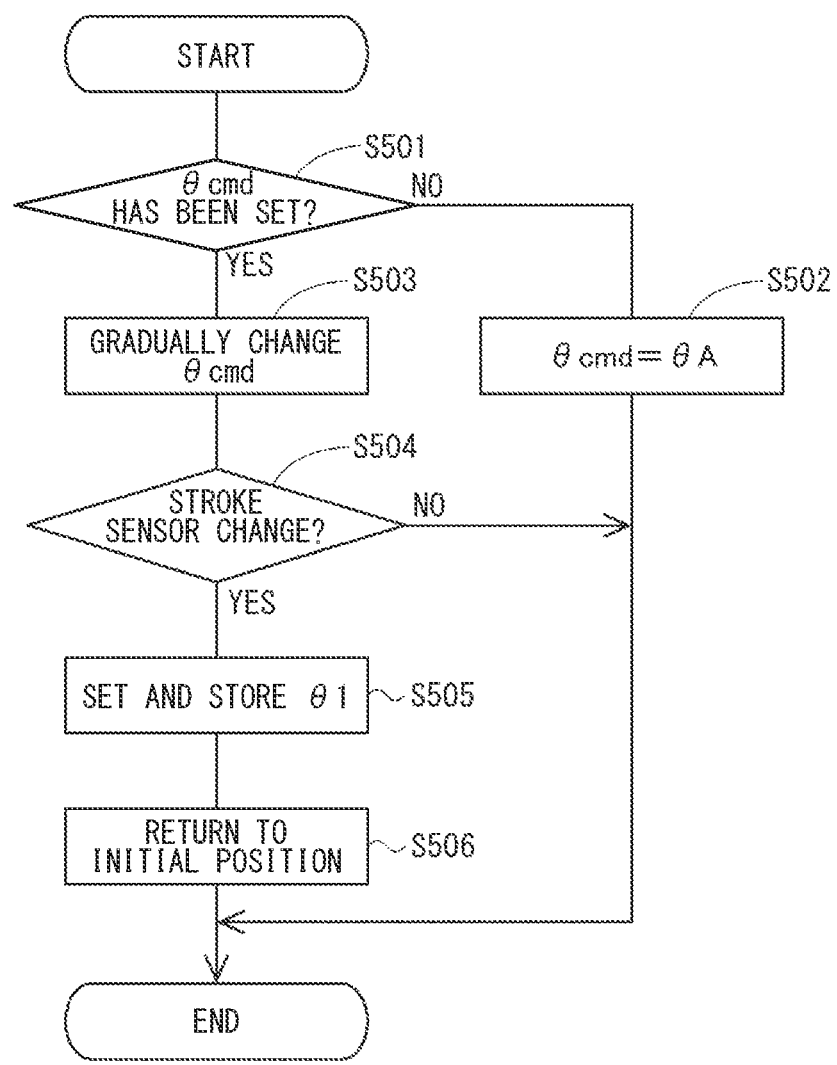
FIG. 14 is a flowchart showing learning process according to a third embodiment.

A third embodiment is shown in FIG. 14. The process in the engagement position learning unit 68 is different in this embodiment, and therefore, this point will be mainly described. In the present embodiment, instead of the motor current Im, the configuration learns the engagement start position θ1 based on the detection value of the stroke sensor 33. As described in the above embodiment, the detection value of the stroke sensor 33 changes from the position where the first friction plate 21 reaches the engagement start position St1, and the stroke sensor 33 detects The drive amount of the first friction plate 21 (see FIG. 12).

The learning process of this embodiment will be described with reference to the flowchart of FIG. 14. The process of S501 and S502 is the same as the process of S401 and S402 in FIG. 11, and the process of S503 is the same as the process of S408.

In S504, the engagement position learning unit 68 determines whether or not the detection value of the stroke sensor 33 has changed. When it is determined that the detection value of the stroke sensor 33 has not changed (S504: NO), the drive control of the motor 30 is continued. When it is determined that the detection value of the stroke sensor 33 has changed (S504: YES), the process proceeds to S505.

In S505, the current encoder count value θen is set as the engagement start position θ1, and is stored in a memory or the like. The process of S506 is the same as the process of S418, where the target count value θcmd is set to the initial position θ0, and where the first friction plate 21 is returned to the initial position St0.

The engagement position learning unit 68 learns the engagement start position θ1 based on the detection value of the stroke sensor 33 that detects the drive amount of the first friction plate 21. Even in this way, the engagement start position θ1 can be appropriately learned. In addition, the same effects as those of the above embodiment can be obtained.

Other Embodiments

In the above embodiment, the first friction plate and the second friction plate form the first engagement member and the second engagement member. In another embodiment, the first engagement member and the second engagement member are not limited to the friction plates, and may have any shape or the like. In the present embodiment, the first friction plate is provided on the main motor side, and the second friction plate is provided on the engine side. In another embodiment, the engine side or the drive shaft side may be provided with the first friction plate, and the MG side may be provided with the second friction plate.

In the above embodiment, the derivative-precedence PI control is performed in the position feedback control and the torque control. In another embodiment, the position feedback control and the torque feedback control are not limited to the derivative-precedence PI control, and may be another control method such as PID control. Further, the configuration of the control device may be different from that of the above embodiment, and each control of the above embodiment may be performed by a control unit other than the clutch control unit.

In the above embodiment, the clutch actuator is a DC brushless motor. In other embodiments, a motor other than a DC brushless motor may be used. Further, the clutch actuator may be any actuator as long as the stroke amount is controllable, and may be, for example, a solenoid or the like.

In the above embodiment, the encoder is built in the motor. In other embodiments, the encoder may not be built in the motor. Further, the motor rotation angle sensor that detects the rotation of the motor is not limited to the encoder and another sensor such as resolver may be used. In the above embodiment, the count value of the encoder is subjected to the phase advance filter process and is used in the position feedback control. According to the other embodiments, the phase advance filter may be omitted, and the position feedback control may be performed by using the rotational angle of the motor itself or by using a value, which is other than the encoder count value and is convertible into the rotation angle of the motor.

In the above embodiment, the electric clutch device is provided between the engine and the main motor. In another embodiment, a clutch provided between the main motor and the drive shaft may be the electric clutch device of the above embodiment. In the above embodiment, the electric clutch device is used in a parallel hybrid system. In another embodiment, the electric clutch device may be used in a hybrid system other than the parallel hybrid system. Further, the electric clutch device may be used in an in-vehicle device other than the hybrid system, or may be used in a device other than the in-vehicle device.

The control circuit and method described in the present disclosure may be implemented by a special purpose computer which is configured with a memory and a processor programmed to execute one or more particular functions embodied in computer programs of the memory. Alternatively, the control circuit described in the present disclosure and the method thereof may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium. The present disclosure is not limited to the embodiment described above but various modifications may be made within the scope of the present disclosure.

The present disclosure has been described in accordance with embodiments. However, the present disclosure is not limited to this embodiment and structure. This disclosure also encompasses various modifications and variations within the scope of equivalents. Furthermore, various combination and formation, and other combination and formation including one, more than one or less than one element may be made in the present disclosure.

What is claimed is:

1. A clutch control device for an electric clutch device, the electric clutch device including: a first engagement member configured to rotate integrally with a first shaft; a second engagement member configured to rotate integrally with a second shaft; and a clutch actuator, the clutch control device configured to control the clutch actuator to drive the first engagement member with a pressing member that is configured to extend and contract according to drive of the clutch actuator, the clutch control device comprising:

a state determination unit configured to determine an engagement state between the first engagement member and the second engagement member; and a drive control unit configured to control drive of the clutch actuator according to a determination result of the state determination unit, wherein the drive control unit is configured to perform a position control to control the clutch actuator, such that a drive amount of the first engagement member becomes a target stroke amount, when the first engagement member and the second engagement member are separated from each other and a pressing force control to control the clutch actuator, such that a pressing force between the first engagement member and the second engagement member becomes a target pressing force, when the first engagement member and the second engagement member are engaged with each other.

2. The clutch control device according to claim 1, further comprising:

a pressing force conversion unit configured to convert the target pressing force into the target stroke amount, wherein the drive control unit is configured to control the clutch actuator, such that a drive amount of the first engagement member becomes the target stroke amount computed by the pressing force conversion unit, when the first engagement member and the second engagement member are engaged with each other.

3. The clutch control device according to claim 1, further comprising:

an engagement position learning unit configured to learn an engagement start position between the first engagement member and the second engagement member.

4. The clutch control device according to claim 3, wherein the engagement position learning unit is configured to learn the engagement start position based on an actuator current that is an electric current supplied to the clutch actuator.

5. The clutch control device according to claim 3, wherein the engagement position learning unit is configured to learn the engagement start position based on a detection value of a stroke sensor that is configured to detect a drive amount of the first engagement member.

6. The clutch control device according to claim 1, wherein the electric clutch device further includes a lock mechanism that is configured to lock the first engagement member and the second engagement member in a engaged state, wherein
the drive control unit is configured to perform the position control, such that the first engagement member is driven to a maximum engagement force position at which the first shaft and the second shaft rotate at a same rotation speed, and subsequently, a drive amount of the first engagement member becomes the target stroke amount that is set according to a lock position at which the lock mechanism is enabled to perform lock.

7. A clutch control device comprising:
a processor configured to
   determine an engagement state between a first engagement member and a second engagement member of an electric clutch device
   drive a clutch actuator to cause a pressing member to extend and contract to drive the first engagement member according to a determination result of the state determination unit
   perform a position control to control the clutch actuator, such that a drive amount of the first engagement member becomes a target stroke amount, when the first engagement member and the second engagement member are separated from each other and
   perform a pressing force control to control the clutch actuator, such that a pressing force between the first engagement member and the second engagement member becomes a target pressing force, when the first engagement member and the second engagement member are engaged with each other.

* * * * *